United States Patent [19]

Simone et al.

[11] 4,171,662

[45] Oct. 23, 1979

[54] SECURITY SCREW

[75] Inventors: James V. Simone, High Point, N.C.; Charles H. Olmstead, Worcester, Mass.

[73] Assignee: Wright Line Inc., Worcester, Mass.

[21] Appl. No.: 823,609

[22] Filed: Aug. 11, 1977

Related U.S. Application Data

[63] Continuation-in-part of Ser. No. 752,197, Dec. 20, 1976, abandoned.

[51] Int. Cl.² ............................................. F16B 23/00
[52] U.S. Cl. ........................................... 85/45; 85/9 R
[58] Field of Search .............................. 85/45, 9 R, 35; 145/50 R, 50 A

[56] References Cited

U.S. PATENT DOCUMENTS

| 131,843 | 10/1872 | Brooks | 85/45 |
| 2,770,998 | 11/1956 | Schwartz | 85/45 |
| 3,929,152 | 12/1975 | Graham | 85/45 X |

*Primary Examiner*—J. Franklin Foss
*Attorney, Agent, or Firm*—Milton E. Gilbert

[57] ABSTRACT

A screw having its head shaped to prevent its removal by unauthorized persons, characterized in that it has peripherally thereof an odd number of sides arranged symmetrically with respect to the center of the head and inclined to the axis of the screw to prevent removal of the screw by the use of pliers. The screw is removed by the use of a matching socket wrench.

5 Claims, 23 Drawing Figures

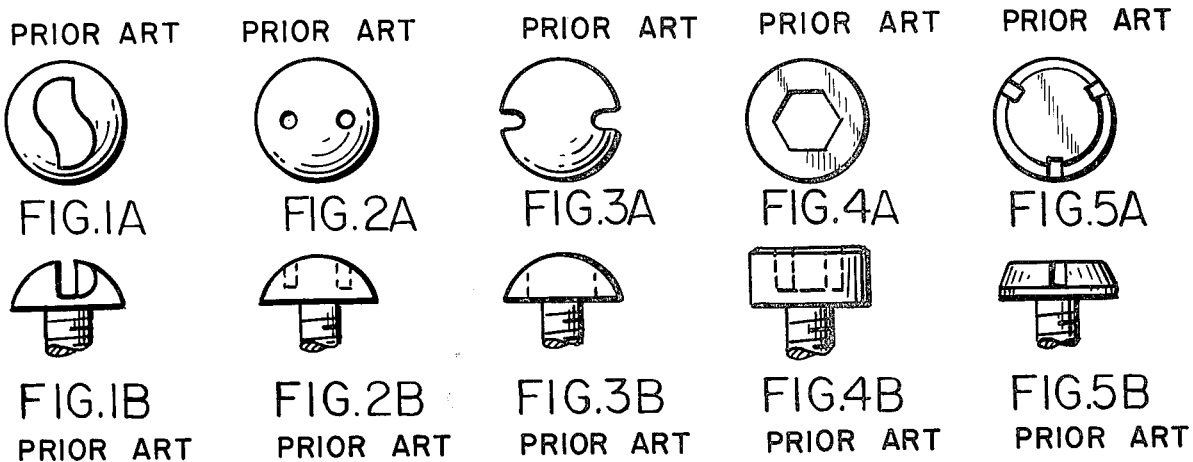
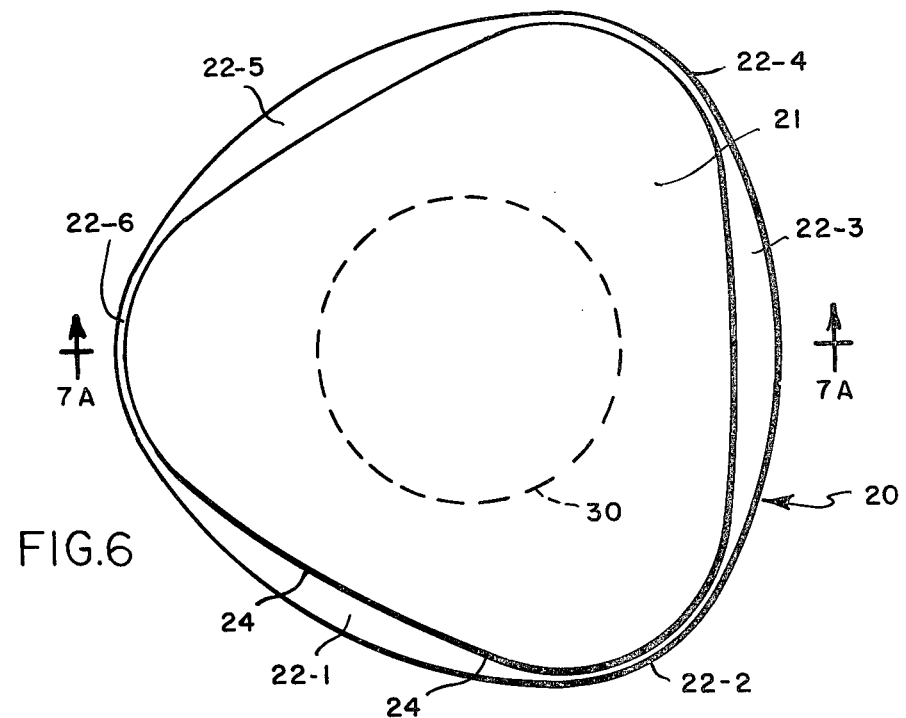
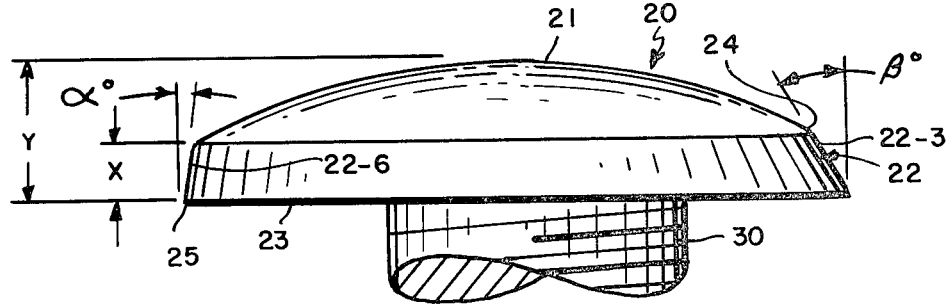
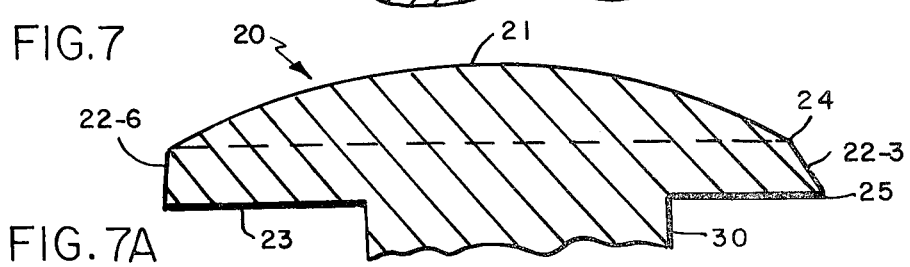

SECURITY SCREW

This application is a continuation-in-part of U.S. application Ser. No. 752,197, filed Dec. 20, 1976; now abandoned.

BACKGROUND OF DISCLOSURE

This disclosure is directed to machine or wood screws and is more particularly directed to screws often termed security screws, which are purposely made difficult to remove by unauthorized persons not having the required instrument needed for removal thereof.

Security screws now generally available consist of the following types: one-way screws, drilled spanner, slotted spanner, pinned socket screw, and the Holt screw. The screws are shown, respectively, in FIGS. 1A, B to 5A, B and are indicated as prior art.

The one-way screw, FIGS. 1A and 1B, consist of a standard slotted screw which has the head milled away so that it can only be driven one way. It is a necessarily expensive screw because the head has to be slotted and milled into shape. The head configuration is obtained in three steps: (1) cold heading, (2) slotting, and (3) milling. While the one-way screw is effective, it is expensive and unsightly and very difficult to remove for servicing. It is installed with a regular screwdriver.

The drilled spanner is shown in FIGS. 2A and 2B and the slotted spanner is shown in FIGS. 3A and 3B. They are both, by nature, expensive as the head configurations require either drilling or milling after cold heading. Both screws are installed and removed by using a special spanner wrench. Unauthorized persons can easily remove them by rotating them with a pin punch and hammer.

The hex socket security screw, FIGS. 4A and 4B, is a standard socket head screw which has a pin installed in the center of the socket cavity. It can only be installed and removed by using a hex key wrench that has a hole drilled in the end to slip over the pin. A counterfeit wrench can be made only by annealing a standard wrench, drilling the hole, and rehardening the wrench. The screw can be removed by unauthorized persons by breaking the pin off using a small punch and then using a regular hex key wrench.

These screws are very expensive to manufacture. The head cavity is first broached to its hex shape. A hole is drilled to accommodate.

The Holt screw, FIGS. 5A and 5B, is apparently relatively new to the market. It is installed and removed by using a special socket wrench which has the exact configuration for each screw head size. The screw is driven by the three near vertical slots in the periphery of the binding type screw head.

The screw can easily be removed by unauthorized persons by using a hammer and pin punch to rotate the head. Its cost is moderate compared to the other security screws, but it requires a cold heading operation and a subsequent slot-forming operation to manufacture.

The screw head form described in this disclosure has none of the disadvantages of any of the above screws. It is the most secure because it has no protrusions or cavities in which one might use a pin punch or other tool. Its profile is very low and tapered to thwart the use of pliers. It can only be readily removed by the use of the socket wrench made for its particular size.

Additionally, the preferred embodiments are inexpensive to manufacture since only one cold heading operation is required for their manufacture. No secondary drilling or milling operations are needed.

BRIEF DESCRIPTION OF THE DISCLOSURE

The security screw of this invention has a low profile head and a threaded portion coupled thereto and is characterized in that the peripheral surface of the head embodies an odd number of sides arranged symmetrically with respect to the center of the head and inclined to the axis of the screw to prevent removal of the screw by means of the use of pliers. In one form there are three sides and in another five sides. Optionally, the head in either peripheral configuration may be provided with a diametrical slot and the crown slashed at opposite sides and at opposite ends of the slot to provide raised, tapered shoulder portions for rotating the head in one direction to insert the screw, but to prevent its rotation in a direction to remove the screw.

BRIEF DESCRIPTION OF THE DRAWINGS

FIGS. 1A and 1B are top and side views of a prior art slotted security screw;

FIGS. 2A and 2B are top and side views of a prior art drilled spanner security screw;

FIGS. 3A and 3B are top and side views of a prior art slotted spanner security screw;

FIGS. 4A and 4B are top and side views of a prior art hex security screw;

FIGS. 5A and 5B are top and side views of a prior art Holt security screw;

FIG. 6 is a top plan view of one form of security screw wherein the head is of rounded-off triangular configuration;

FIG. 7 is a side elevational view of the screw of FIG. 6;

FIG. 7A is a sectional view taken along line 7A—7A of FIG. 6;

DETAILED DESCRIPTION OF THE DISCLOSURE

Figure 8:
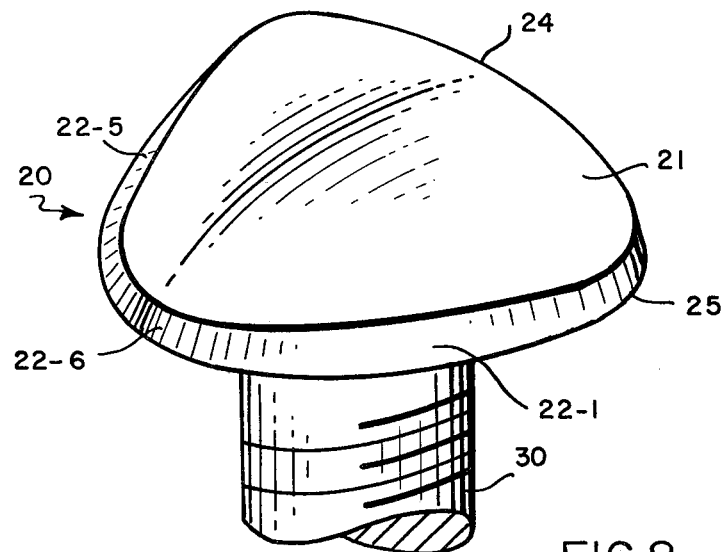
FIG. 8 is an isometric of the security screw shown in FIGS. 6, 7 and 7A.

Referring to FIGS. 6 to 9, the screw comprises a head 20 and a conventional threaded portion 30. The head has a curved crown or cap 21, a peripheral skirt 22, and a flat annular bottom side 23. In accordance with one preferred form, the skirt comprises three major inclined surfaces 22-1, 22-3 and 22-5 arranged symmetrically with respect to the center of the head which impart to the head the triangular configuration shown in these figures and three minor inclined surfaces 22-2, 22-4 and 22-6. The said surfaces terminate, respectively, in the top skirt line 24 and the bottom skirt line 25 and are defined by six arcs.

Figure 9:
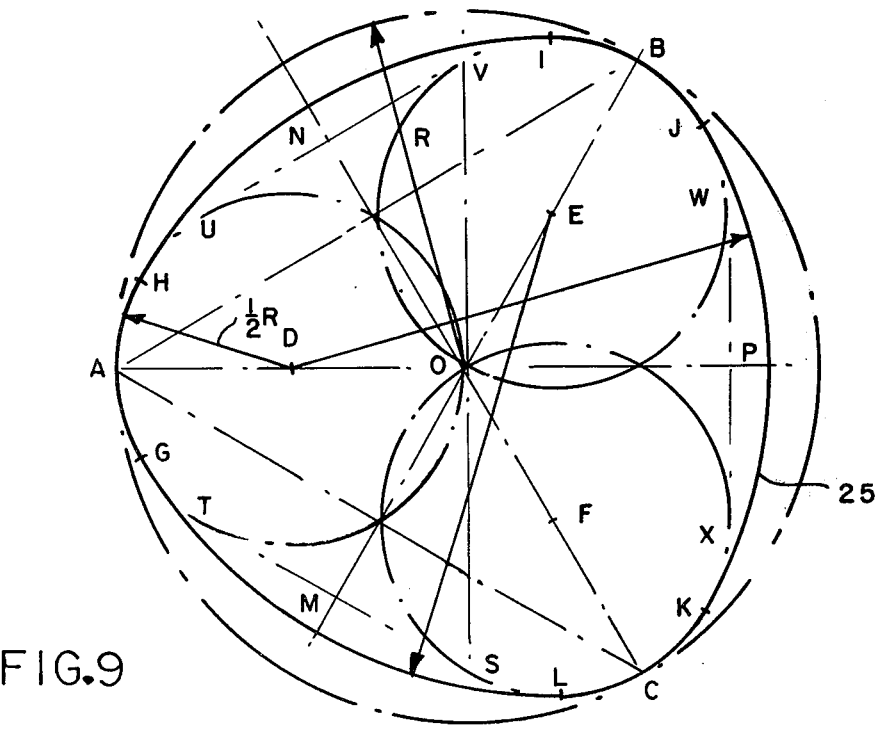
FIG. 9 is a view illustrating the preferred manner for developing the rounded-off triangular configuration of the head.
Figure 10:
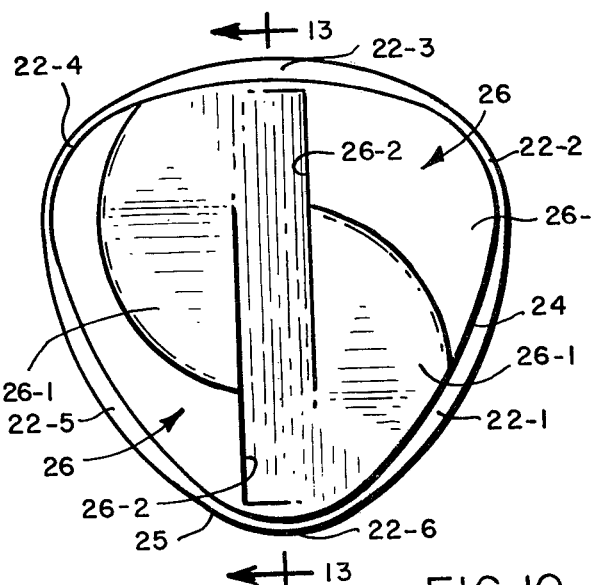
FIG. 10 is a top plan view of an alternate embodiment of the disclosure to permit the security screw to be rotated in one direction by a screwdriver.
Figure 12:
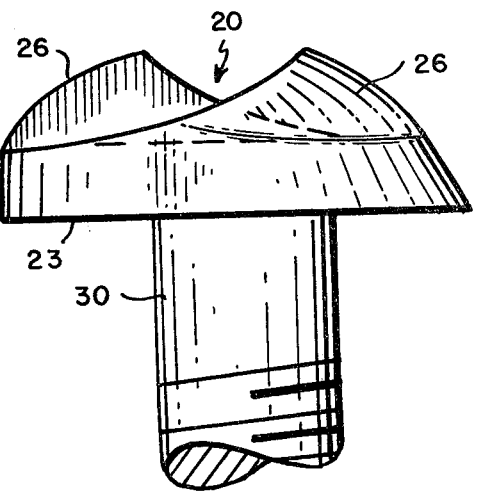
FIG. 12 is a side elevational view of the screw of FIG. 10.
Figure 11:
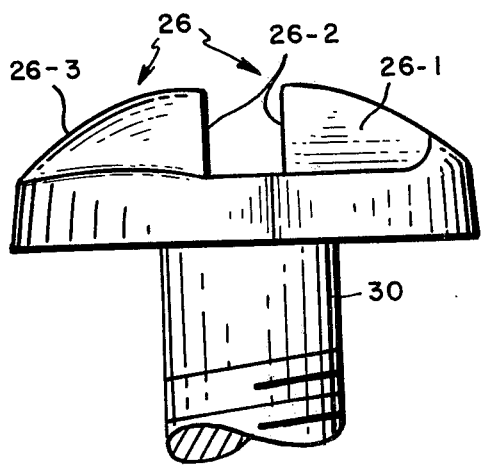
FIG. 11 is a front elevational view of the screw of FIG. 10.
Figure 13:
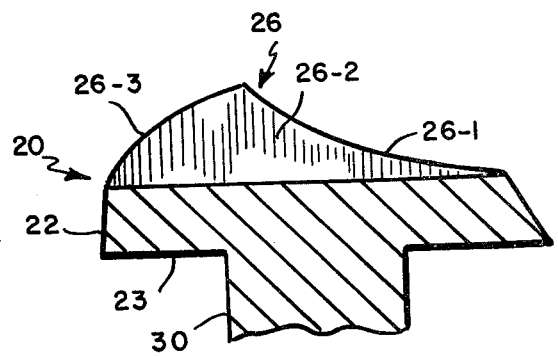
FIG. 13 is a sectional view taken along line 13—13 in FIG. 10.
Figure 14:
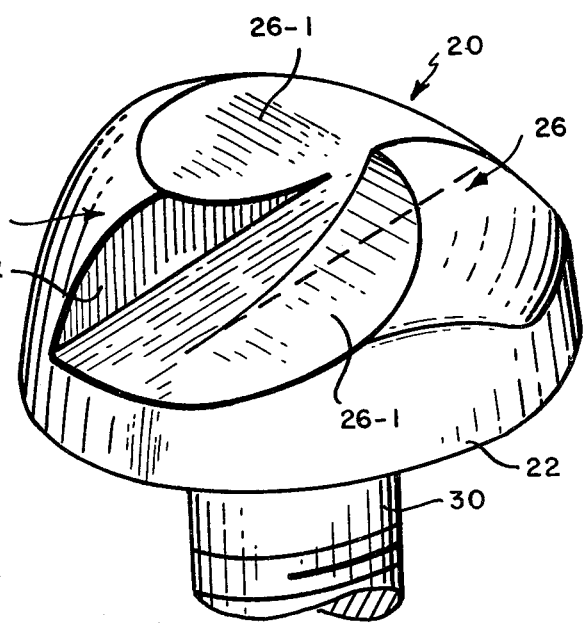
FIG. 14 is an isometric view of the screw of FIGS. 10–13.

The arcs defining the bottom skirt line 25 are preferably determined as follows with reference to FIG. 9; assuming the full diameter to be 2R, lay off lines 0A, 0B, and 0C. Each line is equal to R. Locate points D, E and F which are ½ R from the origin 0. At points D, E and F, describe three circles with radius ½ R. From point D, describe arc JK such that the arc becomes tangent to the circles about E and F. From point E, describe arc LG such that the arc becomes tangent to the circles about F and D. From point F, describe arc HI such that the arc becomes tangent to the circles about F and D. The line H,I,J,K, L and G now describes the bottom skirt line or bottom periphery of the head.

The head cross section is shown in FIG. 7A. Its profile is most preferably about ½ lower than the ASA standards for binding head screws in order to prevent removal by pliers. In addition, to prevent gripping of the head by pliers, the skirt surfaces 22-1 to 22-6 are tapered so that plier jaws will slip off as the screw is attempted to be firmly grasped to turn it. It has been found that the skirt surfaces 22-1, 22-3, and 22-5 (see FIG. 7) should be set at an angle (angle of inclination) between about 40° to 70° and most preferably 50° to 60° with respect to a line which is perpendicular to the flat bottom 23. The most preferred angle being about 56° for best results. It has also been found that the skirt surfaces 22-2, 22-4, and 22-6 oppositely disposed to surfaces 22-1, 22-3, and 22-5 should be at a smaller angle (angle of inclination) of preferably about 3° to 10° and most preferably 5° with respect to a line perpendicular to the bottom 23 so that the plier jaws are further prevented from obtaining a good grip on the screwhead.

While the above angular relationships are most preferred, it should be understood that the angle would be quite acceptable if it was about 0° to 15°. Most preferably, the surfaces 22-1, 22-3 and 22-5 are inclined at an angle which is at least four times that of surfaces 22-2, 22-4 and 22-6.

The security feature of this invention is most advantageous on the screws in the #2 to #12 machine screw range in order to prevent their removal by the use of cold chisels. A table of head sizes most suitable for this invention for #2 to #12 machine screws appear below. For thread size, consult ASA table for binding head screws #B18. 6-1947 in Machinery's Hand Book. Representative overall head heights and skirt heights are given in the table below for #2 to #12 machine screws of the diameters as shown:

| MACHINE SCREW (Nominal Size) | HEAD Nominal Diameter 2 R (inches) | OVERALL HEAD HEIGHT Y (inches) | SKIRT HEIGHT X (inches) |
|---|---|---|---|
| 2 | .186 | .035 | .017 |
| 3 | .200 | .038 | .019 |
| 4 | .220 | .041 | .020 |
| 5 | .250 | .047 | .023 |
| 6 | .280 | .052 | .026 |
| 8 | .340 | .064 | .032 |
| 10 | .386 | .072 | .036 |

-continued

| MACHINE SCREW (Nominal Size) | HEAD Nominal Diameter 2 R (inches) | OVERALL HEAD HEIGHT Y (inches) | SKIRT HEIGHT X (inches) |
|---|---|---|---|
| 12 | .438 | .082 | .041 |

The length of the threaded portion 30 is preferably ¼" or less, e.g., ⅛", 3/16", etc., although larger lengths may advantageously use this invention.

Figure 15:
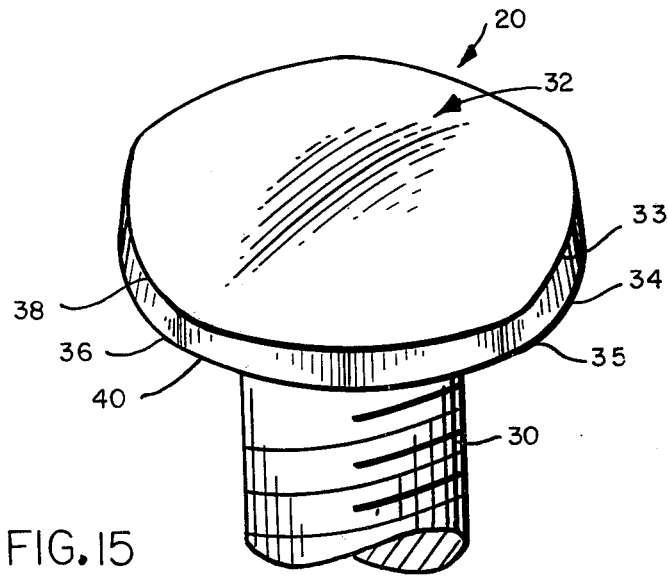
FIG. 15 is an isometric view of a security screw of rounded-off pentagonal configuration.
Figure 17:
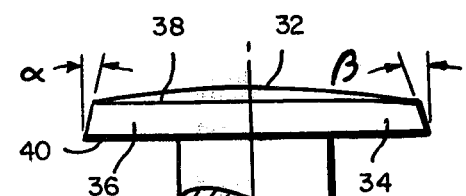
FIG. 17 is an elevation of the head showing the configuration of the crown.
Figure 16:
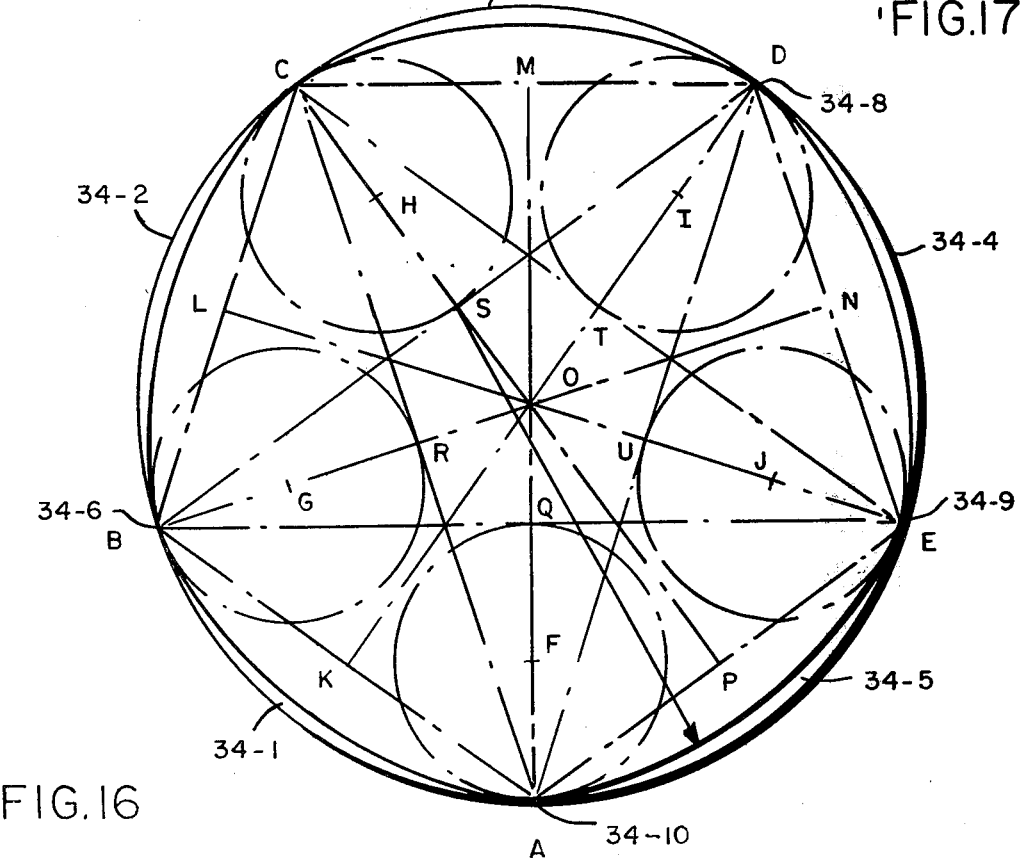
FIG. 16 is a plan view illustrating the preferred manner of developing the rounded-off pentagonal configuration of the head shown in FIG. 15.

FIGS. 15 to 17 illustrates the now most preferred form of screw comprising a head 20 and a conventionally threaded portion 30. The head comprises a curved crown or cap 32, a peripheral skirt 34 and a flat annular bottom side 36. The skirt comprises five major inclined surfaces 34-1, 34-2, 34-3, 34-4 and 34-5 which are arranged symmetrically with respect to the center of the head and which impart the pentagonal configuration to the head. The said surfaces terminate, respectively, in the top skirt line 38 and in the bottom skirt line 40, said skirt lines being defined by 10 arcs.

The arcs defining the bottom skirt line 40 are determined as follows: Referring to FIG. 16, lay off the lines AB, BC, CD, DE and EA within a circle having its center at 0 such that the five lines form a pentagon. Now lay off the lines AM, BN, CP, DK and EL such that these lines pass through the center of the circle 0 and the points A, B, C, D and E, respectively. Describe five circles at the points F, G, H, I and J whose radii are one-half the length of the segment AQ (or BR or CS or DT or EU) and describe five arcs with centers at the points Q, R, S, T and U such that the arcs terminate at the point of tangency with the five smaller circles. The bottom skirt line 40 peripherally of the head is now defined by the five large arcs 34-1 to 34-5 and the five arc segments of the five small circles.

The head cross section, FIG. 17, like that of the screw shown in FIGS. 6 to 9, is preferably about one-third lower than the ASA standards for binding head screws in order to prevent removal by pliers. In addition, to prevent gripping of the head by pliers, the skirt surfaces 34-1 to 34-5 are tapered at an angle in the order of 40° to 70° and most preferably 50° to 60° with respect to a line which is perpendicular to the flat bottom 40. The most preferred angle is about 56° for best results. The inclination at the points of tangency of the small circles with the large circle which are, respectively, the surfaces 34-6, 34-7, 34-8, 34-9 and 34-10 would be at a smaller angle of inclination of preferably about 3° to 10° and most preferably 5° with respect to a line perpendicular to the bottom 40.

While the above angular relationships are most preferred, it should be understood that the angle would be quite acceptable if it was about 0° to 15° and the angle being at least 4 times that of the angle.

Reference should now be had to FIGS. 10 to 14 which show a modified form of the screw. In these Figures, the skirt 22, the bottom 23 and the threaded portion are the same as described with reference to FIGS. 6 to 9 and therefore like numbers are used. However, the top of the head 20 is in these figures provided with two shoulders 26 with curved camming portions 26-1, facings 26-2 and outer curved portions 26-3.

The arced triangular-shaped facings 26-2 are provided to permit a screwdriver to be inserted to drive the screw in one direction to insert same. The curved camming portions 26-1 are sloped as shown to prevent turning of the screw by a screwdriver in a reverse direction to remove it. In order to remove the security screw of this invention, a special socket having the shape of the head formed, e.g., by molding or casting techniques well-known in the art is used.

Thus, this invention provides a new and improved security screw uniquely suitable for retaining covers of business machines, such as punches used in providing betting tickets, securely in place. The screws of this invention, because of their shape, are extremely difficult to remove except by those authorized individuals having the special tool needed to remove the screws.

We claim:

1. A security screw comprising a head and threaded shank characterized in that the peripheral surface of the head is defined by an odd number of arcuate surfaces of equal arcuate length disposed symmetrically about the axis of the screw, said surface collectively constituting the entire peripheral surface of the head and each said surface having a maximum inclination at its ends, said surfaces being bordered at the upper and lower edges by arcs of different radius of curvature with the arcs of lesser radius of curvature defining a top line and the arcs of greater radius of curvature defining the bottom line such that the arcuate surfaces taper toward the axis of the screw from the bottom to the top.

2. A security screw comprising a head and a threaded shank characterized in that the peripheral surface of the head is defined by three arcuate surfaces of equal arcuate length disposed symmetrically about the axis of the screw, said surfaces collectively constituting the entire peripheral surface of the head and each said surface having a maximum inclination midway between its ends and a minimum inclination at its ends, said surfaces being bounded at the upper and lower edges by arcs of different radius of curvature, with the arcs of lesser radius of curvature defining the top line and the arcs of greater radius of curvature defining the bottom line such that the arcuate surfaces taper toward the axis of the screw from bottom to top.

3. A security screw according to claim 2 wherein the maximum inclination is approximately 50° and the minor inclination approximately 0°.

4. A security screw comprising a head and a threaded shank characterized in that the peripheral surface of the head is defined by five arcuate surfaces of equal arcuate length disposed symmetrically about the axis of the screw, said surfaces collectively constituting the entire peripheral surface of the head and each such surface having a maximum inclination midway between its ends and a minimum inclination at its ends, said surfaces being bounded at the upper and lower edges by arcs of different radius of curvature with the arcs of lesser radius of curvature defining a top line and the arcs of greater radius of curvature defining a bottom line such that the arcuate surfaces taper toward the axis of the screw from bottom to top.

5. A security screw according to claim 4 wherein the maximum inclination is approximately 50° and the minor inclination approximately 0°.

* * * * *